US011567484B1

(12) United States Patent
Marusich et al.

(10) Patent No.: US 11,567,484 B1
(45) Date of Patent: Jan. 31, 2023

(54) APPARATUS AND METHOD FOR ANALYZING MACHINABILITY OF A PART FOR MANUFACTURE

(71) Applicant: PROTOLABS, INC., Maple Plain, MN (US)

(72) Inventors: Troy David Marusich, Eden Prairie, MN (US); Shuji Usui, Minneapolis, MN (US)

(73) Assignee: PROTOLABS, INC., Maple Plain, MN (US)

( * ) Notice: Subject to any disclaimer, the term of this patent is extended or adjusted under 35 U.S.C. 154(b) by 0 days.

(21) Appl. No.: 17/589,133

(22) Filed: Jan. 31, 2022

(51) Int. Cl.
*G06F 30/20* (2020.01)
*G05B 19/418* (2006.01)
*G06F 30/27* (2020.01)
*G06F 30/17* (2020.01)

(52) U.S. Cl.
CPC ......... *G05B 19/4188* (2013.01); *G06F 30/20* (2020.01); *G06F 30/27* (2020.01); *G06F 30/17* (2020.01)

(58) Field of Classification Search
CPC ...... G06F 30/20; G06F 30/27; G05B 19/4188
USPC ............................................. 703/1, 2; 706/7
See application file for complete search history.

(56) References Cited

U.S. PATENT DOCUMENTS

| | | | |
|---|---|---|---|
| 7,292,965 B1 | 11/2007 | Mehta et al. | |
| 8,239,284 B2 | 8/2012 | Lukis et al. | |
| 9,002,501 B1 | 4/2015 | Rodrigue et al. | |
| 10,373,183 B1 | 8/2019 | Jacobs, II et al. | |
| 10,466,681 B1 * | 11/2019 | Jones ............... | G05B 19/40937 |
| 2012/0271443 A1 | 10/2012 | Sinha et al. | |
| 2015/0127131 A1 * | 5/2015 | Herrman ............ | G06Q 30/0283 |
| | | | 700/98 |
| 2015/0127480 A1 * | 5/2015 | Herrman ............ | G06Q 30/0611 |
| | | | 705/26.4 |
| 2020/0184125 A1 | 6/2020 | Machalica | |
| 2020/0401113 A1 * | 12/2020 | Yuan ................ | G05B 19/41865 |
| 2021/0133788 A1 | 5/2021 | Jacobs et al. | |

OTHER PUBLICATIONS

Can GD&T Extraction Really Be Automated?; By: Christopher Mendicino; Date: Jun. 28, 2020.

* cited by examiner

*Primary Examiner* — Andre Pierre Louis
(74) *Attorney, Agent, or Firm* — Caldwell Intellectual Property Law, LLC

(57) ABSTRACT

In an aspect an apparatus for analyzing machinability of a part for manufacture, wherein the apparatus comprises a processor. The processor is configured to receive a representative part model of a part for manufacture. The processor may also be configured to extract a semantic datum from the print of the part for manufacture. A machinability datum is determined as a function of the semantic datum. A manufacturing quote is generated as a function of the machinability datum.

18 Claims, 6 Drawing Sheets

US 11,567,484 B1

APPARATUS AND METHOD FOR ANALYZING MACHINABILITY OF A PART FOR MANUFACTURE

FIELD OF THE INVENTION

The present invention generally relates to the field of computer-aided design and structure fabrication. In particular, the present invention is directed to an apparatus and method for analyzing machinability of a part for manufacture.

BACKGROUND

Computer-aided drawings typically convey information about a to-be-fabricated structure, such as a part or an assembly of components of a part. These parts included in a computer-aided drawing are not designed in view of design-for-manufacturability constraints. Design-for-manufacturability constraints include the time required to machine the product, set-up time of the computer numeric control machine, material type, geometric tolerance, volume of the material to be machined, and the like. Additionally, design-for-manufacturability constraints may include constraints on overhangs and free spans, minimum angles, and minimum section thickness. Designing a part in view of design-for-manufacturability constraints facilitates the manufacturing process required to reduce manufacturing by limiting undesirable leftover material due to the limitation of the machining process. The leftover materials are undesirable, but unavoidable; the milling tools are not guaranteed to reach every part of the surfaces. Thus, it is extremely challenging to generate reliable design for manufacturability of a part to be machined.

SUMMARY OF THE DISCLOSURE

In an aspect an apparatus for analyzing machinability of a part for manufacture, wherein the apparatus comprises a processor. The processor is configured to receive a representative part model of a part for manufacture. The processor may also be configured to extract semantic datum from the print of the part for manufacture. A machinability datum is determined as a function of the semantic datum. A manufacturing quote is generated as a function of the machinability datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
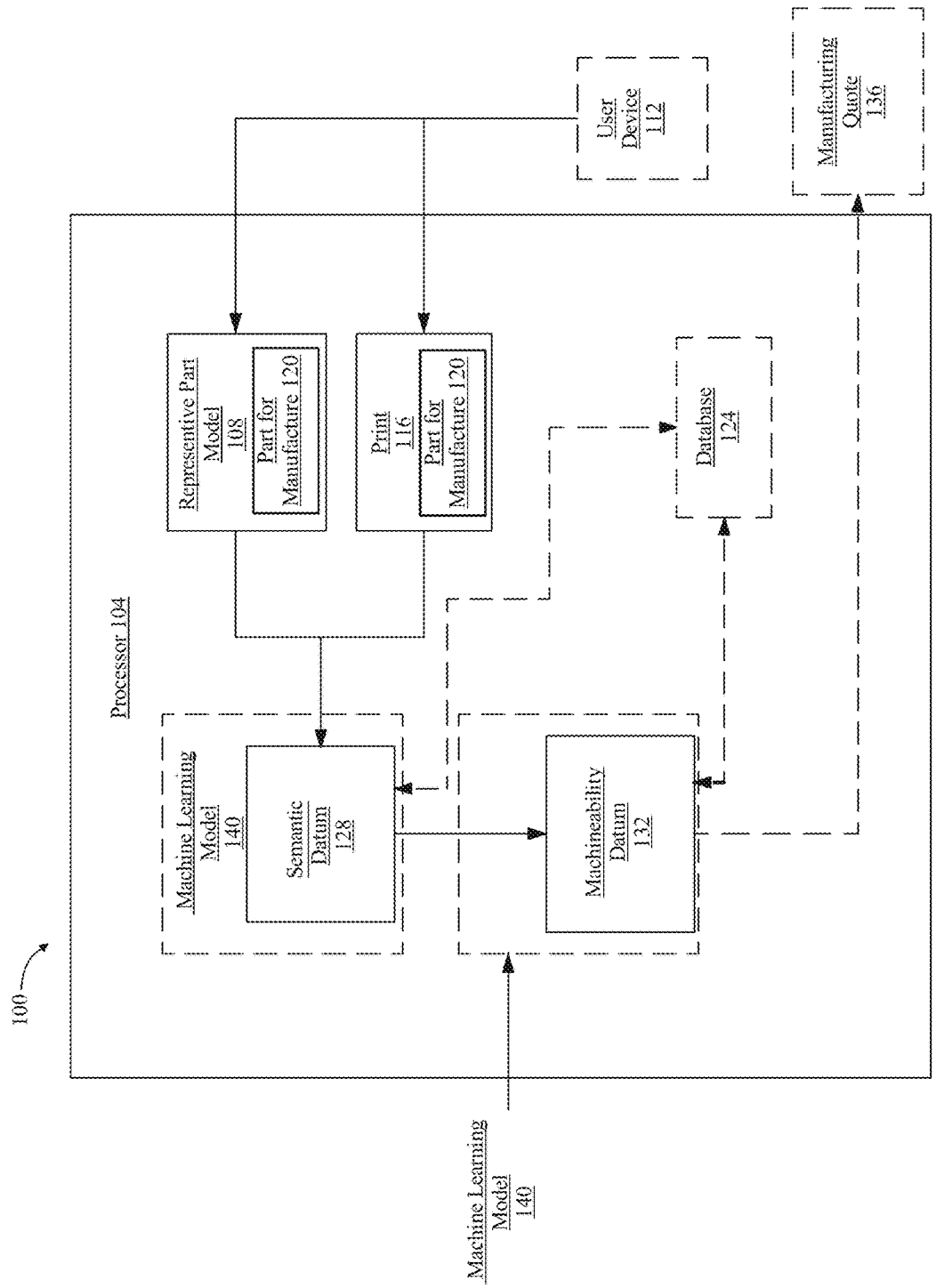
FIG. 1 is a high-level block diagram illustrating an embodiment of an apparatus for geometric dimensioning and tolerancing of a part for manufacture.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for analyzing machinability of a part for manufacture. In an embodiment, the apparatus may comprise a processor. The processor may be configured to receive a representative part model of a part for manufacture. The processor may also be configured to an extract a semantic datum from the print of the part for manufacture. A machinability datum is determined as a function of the semantic datum. A manufacturing quote is generated as a function of the machinability datum. Aspects of the present disclosure can be used to display geometric semantic datum on a representative part model. Aspects of the present disclosure can also be used to determine the manufacturability of a part for manufacture. Exemplary embodiments illustrating aspects of the present disclosure are described below in the context of several specific examples.

Each subtractive manufacturing process used may be any suitable process, such as, but not limited to, rotary-tool milling, drilling, turning, electronic discharge machining, ablation, etching, erosion, cutting, and cleaving, among others. Fundamentally, there is no limitation on the type of subtractive manufacturing process(es) used other than each is compatible with composition of the body of material and/or the fixating material, depending on when a particular subtractive manufacturing process is used in the overall method. For example, differing subtractive manufacturing processes can be used before and after the fixating material has been installed, such that the subtractive machining process used prior to installing the fixating material does not need to be compatible with the fixating material, whereas each subtractive manufacturing process after the fixating material has been installed may need to be compatible with the fixating material, for example, if it is used to remove any of the fixating material, incidentally or intentionally.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to affect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Referring now to FIG. 1, an exemplary embodiment of apparatus 100 for a system of geometric dimensioning and tolerancing of a part for manufacture and a method for its use is illustrated. System includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, Processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 is configured to receive a representative part model 108 from a user device 112. Representative part model 108 further includes a plurality of sides. A "representative part model," as used in this disclosure, is a computer model of a part to be manufactured, wherein manufacturing may include any manufacturing process as described in the entirety of this disclosure. Representative part model 108 may further include any data describing and/or relating to a computer model of a part to be manufactured. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systèmes SolidWorks Corp, Waltham, Mass.), AUTOCAD® software and/or Fusion 360 software (available from Autodesk, Inc., San Rafael, Calif.), PTC Creo software (available from PTC, Inc., Boston, Mass.), Siemens NX software (available from Siemens PLM Software, Plano, Tex.) and MICROSTATION® software (available from Bentley Systems, Inc., Exton, Pa.), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure. The computer model may include a polygon mesh, such as a collection of vertices, edges, and faces, that define the shape of representative part model 108. For example and without limitation, the faces of the polygon mesh may include triangles, such as a triangle mesh, quadrilaterals, or other simple convex polygons.

Still referring to FIG. 1, representative part model 108 may include a plurality of sides. Each side of plurality of sides, as used in this disclosure, may include a view of representative part model 108 from a plane orthogonal to an axis passing through an origin of representative part model 108. The axis may include, as a non-limiting example, a three-axis coordinate system, such as the x-axis, y-axis, and z-axis, or abscissa, ordinate, and applicate. The axis may include, as a further non-limiting example, any axis as a function of the origin. Persons skilled in the art, upon reviewing the entirety of this disclosure, will be aware of axis which may be suitable for use as each side of the plurality of sides consistently with this disclosure. The origin of the representative part model, as described herein, is a fixed point of reference for the representative part model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of the representative part model. In some embodiments, the representative part model 108 may include physical example of the part to manufactured.

Continuing to refer to FIG. 1, representative part model 108 may further include semantic information of the part to be manufactured. "Semantic information," as described in this disclosure, is data concerning and/or describing product and manufacturing information (PMI) and product life cycle management (PLM). PMI, as used in this disclosure, is data describing non-geometric attributes of a model of a part for manufacture, such as the computer model of representative part model 108, necessary for manufacturing the part, components of the part, and associated assemblies. For example and without limitation, PMI may include geometric dimensions and tolerances, 3D annotation and dimensions, surface finish, material specifications, and the like. In some embodiments, PMI may include details about the Machinability of the part to be manufactured. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in representative part model 108 may be used in processes for pricing a part to be manufactured.

With continued reference to FIG. 1, user device 112 may be configured to, without limitation, transfer a transmission of communication to processor 104. Transmission may include any transmission as described herein. For example and without limitation, transmission may include file transfer protocols such as File Transfer Protocol (FTP), Hypertext Transfer Protocol (HTTP), SSH File Transfer Protocol (SFTP), Secure Copy (SCP), Accelerated File Transfer Protocol (AFTP), and the like. User device 112 may include an additional computing device, such as a mobile device, laptop, desktop computer, tablet, and the like. As an example and without limitation, user device 112 may be a computer and/or workstation operated by an engineering professional. Persons skilled in the art, upon reviewing the entirety of this disclosure, will be aware of various devices which may be suitable for use as user client device consistently with this disclosure. Though the illustrated embodiment of FIG. 1 depicts only one user device 112 in communication with processor 104, in other embodiments two or more user devices 112 may be in communication with processor 104 and each be configured to transmit a transmission of data, wherein the data may include data relevant to the inspection design, such as critical dimensions requiring measurements and tolerances.

With continued reference to FIG. 1, processor 104 is configured to receive a print 116 of part for manufacture 120. A "part for manufacture," as used in this disclosure, is a part to be manufactured, wherein manufacturing may include any manufacturing process as described in the entirety of this disclosure. The part may include any item made of materials such as metals including, for example, aluminum and steel alloys, brass, and the like, plastics, such as nylon, acrylic, ABS, Delrin, polycarbonate, and the like, foam, composites, wood, etc. Print 116 may be any two-dimensional print 116 of part for manufacture 120, such that the two-dimensional print 116 may include any data describing the part for manufacture 120. As used in this disclosure, "two-dimensional" means having, appearing to have, or displaying two out of the three dimensions length, width, and height. Print 116 may include semantic information of part for manufacture 120. Print 116 may include geometric dimensioning and tolerancing (GD&T) information, which may be provided in one or more software files such as DXF files, DWG files, PDF files, and/or the like. Print 116 may be received with representative part model 108 of part for manufacture 120 or received in a separate transmission and/or from another source. Processor 104 may receive representative part model 108 and/or print 116 from a user device 112. User device 112 may include, without limitation, a transmission of communication with at least a server; transmission may include any transmission as described herein. A user device 112 may include an additional computing device, such as a mobile device, laptop, desktop computer, or the like; as a non-limiting example, the user device 112 may be a computer and/or workstation operated by an engineering professional. Persons skilled in the art, upon reviewing the entirety of this disclosure, will be aware of various devices which may be suitable for use as user device 112 consistently with this disclosure. Representative part model 108 and/or print 116 may be stored in a database 120, which may be in apparatus 100 or remote. Database 120 may store information pertaining to, for example, a request for a part to be manufactured, various machines used in manufacturing, materials used to manufacture the part, and the like. Database 124 is described in more detail below in reference to FIG. 3. Print 116 and/or representative part model 108 may be retrieved from memory and/or Database 124.

Continuing to refer to FIG. 1, Database 124 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, processor 104 is configured to extract a semantic datum 128 from print 116 of the part for manufacture 120. As used in this disclosure, "semantic datum" is an element of data describing and/or identifying semantic information is and/or from a print of a part for manufacture. Semantic information 128 may include geometric dimensions and tolerances such as geometric tolerance, 3D annotation and dimensions, surface roughness, surface finish, material specifications, PMI, PLM, and the like of a part for manufacture 120. As used in this disclosure, a "geometric tolerance" is a quantified limit of allowable error of one or more physical attributes of a part for manufacture 120. Semantic datum 128 may include a form tolerance such as straightness, flatness, circularity, and/or cylindricity; a profile tolerance such as profile of a line and/or profile of a surface; an orientation tolerance such as angularity, perpendicularity, and/or parallelism; location tolerance such as position, concentricity and/or symmetry; a runout tolerance such as circular runout and/or total runout; and the like. Semantic datum 128 may be calculated using information from representative part model 108 and/or print 116. Semantic datum 128 may be an input from a user device 112. Semantic datum 128 may be included in print 116 of part for manufacture 120 as symbols, annotations, numerical values, text, embedded information, and/or the like. As used in this disclosure, "text" includes letters, numbers, and/or symbols. Print 116 may include an image representing part for manufacture 120 or a component of the part for manufacture 120, a number representing a numerical tolerance of the component, and/or an indicator that identifies the numerical tolerance is associated with the component. Print 116 may also indicate a unit of measurement and/or a scale, which may be included in semantic datum 128 or on which semantic datum 128 may be based. For example, print 116 may state that the dimensions are in inches, list the scale as "2:1", include a circle representing an exterior cylindrical surface of part for manufacture 120, and have an arrow pointing from "R0.5000+/−0.0003" to the circle. Processor 104 may be configured to recognize "+/−" as a symbol representing a tolerance for the preceding number in the amount of the succeeding number. Processor 104 may also be configured to identify the arrow and that it is point from the numbers to the circle and determined that the tolerance is for the circle, specifically the radius of the circle. Processor 104 may be configured to identify the unit of measurement stated in print 116 and determine that the radius tolerance for the circle is +/−0.0003 inches. Processor 104 may also be configured to identify measurement scale and adjust numbers, including semantic datum 128, accordingly. Processor 104 may be configured to determine scale by comparing an annotation of measurement to an actual length in print 116. In some embodiments, processor 104 may recognize encoding in a file of print 116 as representing semantic datum 128 and may extract semantic datum 128 from the file.

With continued reference to FIG. 1, processor 104 may be configured to extract semantic datum 128 and machinability datum 128 utilizing a machine-learning process. Processor 104 may be configured to use a machine-learning model, which may be trained on the processor 104 or another device. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. Machine-learning model is described in more detail below in reference to FIG. 2.

With continued reference to FIG. 1, to extract semantic datum 128 using machine learning. Semantic training data may correlate inputs and outputs. Semantic training data is a plurality of data entries containing a plurality of inputs that are correlated to a plurality of outputs for training a processor by a machine-learning process to extract semantic datum 128. The machine learning model may contain inputs which may include shapes, symbols, annotations, text, embedded information, and/or the like that contain semantic information, such as GD&T, as discussed above and may include the associated measurements and components of part for manufacture 120. The output of the machine learning model may be semantic datum 128. Semantic training data may contain outputs which may include semantic datum 128. Semantic training data may be collected by recording from prints 116 the shapes, symbols, annotations, text, embedded information, and/or the like that contain semantic information and the corresponding semantic datum 128 that was extracted from them. Semantic training data may be stored in Database 124, and processor 104 may be communicatively connected to Database 124. For example, semantic training data may correlate an "R" followed by a first number, "+/−," followed by a second number; a circle adjacent to the numbers; and an arrow pointing from the numbers to the circle with semantic datum 128 including a radius tolerance for the circle in the amount of the second number. Semantic training data may be collected from journal articles, publicly available information, manual extractions of semantic data from prints, iterations of a machine-learning process, self-learning, and the like. Processor 104 may utilize machine-learning process and output semantic datum 128 based on one or more inputs discussed above and semantic training data.

Still referring to FIG. 1, apparatus 100, such as processor 104 and/or a computing device communicatively connected to the processor 104, may be configured to identify an image in print 116 and/or representative part model 108 as representing part for manufacture 120. As used herein, "communicatively connected" is a process whereby one device, component, or circuit is able to receive data from and/or transmit data to another device, component, or circuit. Processor 104 may be configured to extract geometric dimensions of part for manufacture 120 including height, length, width, radius, depth, and/or the like and may be configured to extract their corresponding location, such as their coordinates. Processor 104 may also be configured to recognize lines including line segments and planes; shapes such as circles, arcs, ovals, ellipsis, polygons, irregular shapes, cylinders, segments of shapes, and the like; and/or markings; determine whether they are included in part for manufacture 120; extract their coordinates and measurements relative to a coordinate system in print 116 and/or representative part model 108; and associate the coordinates and measurements with their corresponding component of part for manufacture 120. For example, processor 104 may be configured to recognize that an image in print 116 and/or representative part model 108 is a circle; determine that it is an image representing part for manufacture 120; extract a center position, such as in x,y,z coordinates, and radius of the circle; and associate the center position and radius with the circle. Processor 104 may also be configured to recognize images in print 116 and/or representative part model 108 as not representing part for manufacture 120 and excluding them such as, for example, lines identifying a coordinate system, annotation lines, centering marks, true position symbols, center lines, and the like. Print 116 and/or representative part model 108 may include information identifying coordinates of the image. Print 116 and/or representative part model 108 may identify that a center mark is not included with the image, which processor 104 may recognize and exclude the center mark from image representing part for manufacture 120. As another example, processor 104 may be configured to recognize an arc in print 116 is an arc, determine that the arc is a component of image representing part for manufacture 120 and should be included in the part for manufacture 120; extract the arc center, x,y,z coordinates, and angle; and associate the arc center, x,y,z coordinates, and angle with the arc. Coordinates and/or measurements of a component of part for manufacture 120 may be calculated based on information in print 116.

With continued reference to FIG. 1, processor 104 is configured to map semantic datum 128 on representative part model 108. Mapping may include inserting in representative part model 108 semantic datum 128 from print 116. Mapping may include positioning semantic datum 128 in representative part model 108 such that the semantic datum 128 aligns with the component of part for manufacture 120 within processor 104 with which the semantic datum 128 concerns. As used in this disclosure, a "component" of a part for manufacture 120 is a feature, part, and/or piece of the part for manufacture 120. For example, mapping may include inserting a semantic datum 128 of a hole radius with an arrow that was pointing to the hole in the image of the part for manufacture 120 in print 116 into representative part model 108 such that the arrow points to the corresponding hole in the image of the part for manufacture 120 in the computer model. Processor 104 may be configured to compare dimensions and/or coordinates of components of part for manufacture 120 in print 116 and representative part model 108 and associate the same components to transfer semantic datum 128 extracted from the print 116 onto the representative part model 108. Association may include matching one or more measurements and/or descriptions of a component in print 116 with a component in representative part model 108 including, without limitation, coordinates, height, length, width, radius, position on part for manufacture 120, and/or the like. For example, processor 104 may associate a circle in print 116 to a cylinder in representative part model 108 by comparing their corresponding radii, coordinates, and/or other measurements. As another example, processor 104 may associate a circle designated by a position GD&T symbol assigned to a 0.5 diameter in print 116 to the only cylinder with a 0.25 radius in representative part model 108. Print 116 may include a concentricity GD&T symbol assigned to a 0.75 inch hole in print 116, which processor 104 may associate with the only 0.375 inch radius hole in representative part model 108. Once components of part for manufacture 120 in print 116 are associated with their corresponding components of the part for manufacture 120 in representative part model 108, then processor 104 may map semantic datum 128 on the representative part model 108 while maintaining their relation to the corresponding measurements of the components. Similarly, processor 104 may associate a line in print 116 with a surface of part for manufacture 120 in representative part model 108 by, for example, comparing the length of the line with the length of the surface and/or comparing the positions of the line and surface on the corresponding images of part for manufacture 120 and/or in relational position to other components of the part for manufacture 120. As an additional example, mapping the semantic datum on the computer model of the part for manufacture 120 further comprises associating a line of the print of the part for manufacture 120 to a plane of the computer model of the part for manufacture 120. In some embodiments, processor 104 mapping semantic datum 128 on representative part model 108 may include superimposing representative part model 108, which may be a three-dimensional image of part for manufacture 120, onto print 116, which may include a two-dimensional image of the part for manufacture 120 and the original semantic datum 128, such that the three-dimensional image is positioned on the two-dimensional image. As used in this disclosure, "superimposing" is placing or laying an image or information over another image or information. For example, superimposing a three-dimensional image of part for manufacture 120 onto print 116 may include placing or laying the three-dimensional image of the part for manufacture 120 onto the image of the part for manufacture 120 in the print 116. Thus, the semantic datum 128 on print 116 may align with the corresponding components of representative part model 108 of part for manufacture 120. In some embodiments, processor 104 may align an outer profile of a three-dimensional image of part for manufacture 120 in representative part model 108 with an outer profile of a two-dimensional image of part for manufacture 120 in print 116.

Still referring to FIG. 1, processor 104 may be configured to import representative part model 108, print 116, and/or information therein such as semantic datum 128 from a first at least a file to a second at least a file, wherein the second at least a file may include a format or file type distinct from the first at least a file. Semantic datum 128 may be imported as a block or unit with a unique tag, which may identify the type and/or origin of semantic datum 128 imported. Processor 104 may be configured to associate semantic datum 128 to corresponding components and/or measurements of part for manufacture 120 based on the tag. Processor 104 may be configured to recognize different types of lines, shapes, symbols including without limitation GD&T symbols, annotations, embedded text, and the like and extract information from the recognition. In some embodiments, the recognition is based on identifying standardized formatting including, without limitation, color. For example, processor 104 may be configured to recognize a line by a unique symbol in print 116 as a center line type. Processor 104 may then extract that the location of the line is the center of part for manufacture 120. As another example, processor 104 may be configured to identify a yellow line segment in print 116 as identifying a distance between two locations on part for manufacture 120 and recognize that the yellow line segment is not the part for manufacture 120. Processor 104 may identify numbers by the line segment and associate the number with the line segment and the two locations on part for manufacture 120. Processor 104 may be configured to map semantic datum 128 on representative part model 108 utilizing a machine-learning process. Processor 104 may be configured to use a machine-learning model, which may be trained on the processor 104 or another device. Map training data may correlate inputs and outputs. Map training data is a plurality of data entries containing a plurality of inputs that are correlated to a plurality of outputs for training a processor by a machine-learning process to map semantic datum on computer model. Map training data may include inputs, which may include semantic datum 128. Map training data may include outputs, which may include position of semantic datum 128 on representative part model 108. Map training data may contain a plurality of data entries containing a plurality of inputs correlated to a plurality of outputs. Map training data may be collected by recording extracted semantic datum 128 from prints 116 and their corresponding position on representative part model 108. Map training data may be collected from journal articles, publicly available information, manual mappings of semantic data from prints onto computer models, iterations of a machine-learning process, self-learning, and the like. Map training data may be stored in Database 124. Processor 104 may utilize machine-learning process and output position of semantic datum 128 on representative part model 108 based on that same semantic datum 128 inputted and semantic training data. Machine-learning process may be implemented like any machine-learning process as described in more detail below in reference to FIG. 2. The machine-learning process using map training data may be distinct from the machine-learning process using semantic training data. Map training data may be used to train this particular machine-learning process.

With continued reference to FIG. 1, processor 104 maybe configure to determine machinability datum 132 from the representative part model 108 as a function of semantic datum 128. As used in this disclosure, "machinability datum" is an element of data describing and/or identifying the machinability of a part for manufacture 120. "Machinability" as used in the current disclosure is the ease with which a work material can be cut (machined) permitting the removal of the material. In an embodiment, machinability datum 132 may be evaluation of if the representative part model 108 can be consistently manufactured to a given standard. In a non-limiting example, a machinability datum 132 may be a Boolean value, a score, or a single datum value for the part for manufacture. Additionally, machinability datum 132 may be a list of geometric features depicted in the model, each of which receives a machinability datum 132. Machinability datum 132 could be a vector or table of values linked to and/or corresponding to features. Machinability datum 132 may be a based on a consideration of the level of difficulty it would take to machine the given part and keep all its features within the given tolerance range. Machinability datum 132 may also be a consideration of the amount of power it would take to machine the parts. In other embodiments, machinability datum 132 may encompass a consideration if a part can be machined as a function of a set of tools that are required to complete. Machinability datum 132 may be determined as a function of semantic datum 128. A person skilled in the would understand that in a general sense, parts with lower tolerances will be less machinable than parts with larger tolerances.

With continued reference to FIG. 1, machinability datum 132 may encompass two sets of factors: the condition of work materials and the physical properties of work materials. As used in the current disclosure, "work materials" are the raw materials that the part is machined out of The condition of the work material are determined by eight factors: microstructure, grain size, heat treatment, chemical composition, fabrication, hardness, yield strength, and tensile strength. Physical properties are those of the individual material groups, such as the modulus of elasticity, thermal conductivity, thermal expansion, and work hardening. Machinability datum 132 may be based on operating conditions, cutting tool material and geometry, and the machining process parameters.

With continued reference to FIG. 1, processor 104 may determine machinability datum 132 from the representative part model 108 using several methods. Processor 104 may be configured to decide which method to use as a function for the work materials and the configuration of the part that is being created. Methods of determining machinability datum 132 may include several methods such as the tool life method, tool forces and power consumption method, surface finish method, the Taylor tool life equation, and the machinability rating method. A person of ordinary skill in the art would know that there is no widely accepted consensus method of determining machinability. With that in mind, accurately determining the machinability of different parts and materials may require any method or combination of methods mentioned herein above.

With continued reference to FIG. 1, machinability datum 132 may be determined as a function of semantic datum 128. Machinability datum 132 and semantic datum 128 may have a relationship that the tighter or lower semantic datum 128 is for a part for manufacture, that part will require more process control. This relationship may be especially true with extremely low tolerances that are more difficult to attain. Semantic datum 128 may influence the quality and cost of a part. Tight or low tolerance machining is typically more expensive because, usually the parts must be machined more slowly and often with more expensive tools. Both time and cost to manufacture a part may directly influence machinability datum 132. Parts with a tighter semantic datum 128 also require more extensive quality CNC inspection, since the window of error is much smaller this may also contribute machinability datum 132 by making a part less machinable. Another factor that can influence machinability datum 132 when dealing with tight tolerance machining is the high reject rate, which tends to be higher. This higher reject rate may also influence machinability datum 132. Tighter tolerances reflected in semantic datum 128 may increase production costs and quality inspection costs which also makes difficult to machine the part.

With continued reference to FIG. 1, processor 104 may be configured to generate machinability datum 132 as an output using a machine-learning process. Machinability training data may correlate inputs and outputs, whereas inputs may include semantic datum 128, the time and cost to manufacture a part, the type of equipment that is required to manufacture a part, cutting forces and power consumption, surface finishing, the tool wear, tool breakage, process monitoring system and/or the machinability rating method. Outputs are machinability data 132. Machinability training data is a plurality of data entries containing a plurality of inputs that are correlated to a plurality of outputs for training a processor by a machine-learning process to extract machinability datum 132. Machinability training data may contain information about workpiece materials including material type, microstructure, grain size, heat treatment, chemical composition, fabrication, hardness, yield strength, and tensile strength, heat transfer coefficient, frictional constant, fracture toughness, modulus of elasticity, thermal conductivity, thermal expansion coefficient, and work hardening, frictional constant, and/or the like. In other embodiments, Machinability training data may include machinability data 132 from previous machine learning models. Machinability training data may include any machinability datum 132 stored in database 124 or a user input. Machinability training date may be used to trained machine-learning model using a machine-learning process to correlate inputs and outputs. Machine-learning model may output machinability datum 132 by using a machine-learning process, as a function of machinability training data and one or more inputs discussed above.

With continued reference to FIG. 1, processor 104 may be configured to determine if the manufacturability of a part as a function of machinability datum. As used in the current disclosure, "manufacturability" is the ease at which a product can be manufactured or produced on a large scale. In an embodiment, manufacturability may be calculated directly using machinability datum 132 because, the ease at which a part can machined directly relates to a parts manufacturability. Generally, the less machinable a part is the less manufacturable a part is. In some embodiments, manufacturability may be determined as a function of cost and time machine each part. The cost to manufacture a part may be driven by time, so the design must minimize the time required to not just machine (remove the material), but also the set-up time of the CNC machine, NC programming, fixturing and many other activities that are dependent on the complexity and size of the part. Additionally, a significant contributing factor to the cost of a machined component is the geometric tolerance to which the features must be made. The tighter the tolerance required, the more expensive the component will be to machine. When designing, specify the loosest tolerance that will serve the satisfactory mechanical functionality of the component with the minimum cost. Tolerances must be specified on a feature-by-feature basis. There are creative ways to engineer components with loose tolerances that still perform as well as ones with tighter tolerances. In other embodiments, manufacturability may be determined as a function of workpiece materials. The most manufacturable types of metals generally include aluminum, brass, and softer metals. As materials get harder, and stronger, such as steel, stainless steel, titanium, and high strength alloys, they become much harder to machine and take much longer, thus being less manufacturable. Most types of plastic are easy to machine, although additions of fiberglass or carbon fiber can reduce the machinability. Plastics that are particularly soft, yet they have machinability problems of fracturing and melting in the cut.

With continued reference to FIG. 1, processor 104 may be configured to identify unmachinable qualities of the part. As used in the current disclosure, "unmachinable qualities" is any quality of the part to be manufactured causes the part to be determined as unmachinable. In a non-limiting example, qualities that make a part unmachinable may include workpiece material deteriorations, tolerances, geometric features for the part to be manufactured, surface roughness, time, cost, a set of tools, fixturing system, tool accessibility, set-up and load time for the part to be manufactured, machinability datum 132, manufacturability, and the like. If the given quality for a part is outside a predetermined range for any of these considerations the part may be considered unmachinable. The unmachinable qualities of the part may be displayed within the manufacturing quote 136 or on the user device 120.

With continued reference to FIG. 1, processor 104 may be configured to identify corrections to the part to improve machinability. Corrections to the part may include suggestions to use a different material that is more machinable. In other embodiments, Corrections may include suggesting a larger tolerance for a particular feature of the part for manufacture 120. Slight changes to the geometry of the features of the part may also be suggested to improve manufacturability. In embodiments. Processor 104 may determine that what correction needs to be made by using a combination of manufacturability, machinability datum 132, semantic datum 128. For example, if a tolerance is too small for a given feature, processor 104 may suggest relaxing that tolerance. In another nonlimiting example, if a part is unmachinable due to its geometry processor 104 may make a suggestion that entails removing or altering that geometrical feature. Processor 104 may be configured to output a plurality of different suggestions to improve machinability of the part for manufacture 120. Part corrections may be displayed within the manufacturing quote 136 or on the user device 120.

Generating a correction may be consistent with the disclosure of U.S. patent application Ser. No. 15/939,209 entitled "METHODS AND SYSTEMS FOR MANUFACTURING A SUPPORT STRUCTURE," and U.S. patent application Ser. No. 17/589,009 entitled "METHODS AND SYSTEMS FOR GEOMETRIC ANALYSIS OF A PART FOR MANUFACTURE," incorporated herein by reference.

With continued reference to FIG. 1, processor 104 identify corrections to improve machinability using machine learning. Corrections training data may correlate inputs and outputs. Whereas inputs to the to the machine learning model may include semantic datum 128, machinability datum 132, manufacturability, workpiece material considerations, the time and cost to manufacture a part, the tool set, the type of equipment that is required to manufacture a part. While the output to the machine learning model is corrections to the part. Corrections training data is a plurality of data entries containing a plurality of inputs that are correlated to a plurality of outputs for training a processor by a machine-learning process to make corrections to improve manufacturability for a part. Corrections training data may contain information about workpiece materials including material type, microstructure, grain size, heat treatment, chemical composition, fabrication, hardness, yield strength, and/or tensile strength. Corrections training data may include tolerances, geometric features for the part to be manufactured, time, cost, a set of tools that is required to machine the part, set-up and load time for the part to be manufactured, machinability datum 132, and/or manufacturability. In other embodiments, Corrections training data may include corrections from previous machine learning models. Corrections training data may include any past corrections of the part stored in database 124 or a user input.

With continued reference to FIG. 1, processor 104 may be configured to generate a manufacturing quote 136. As used in the current disclosure, a "manufacturing quote" is a report detailing the dimensions of the part and the manufacturability of the part. Manufacturing quote 136 may include a written description of the part for manufacture 120. Additionally in a non-limiting example, manufacturing quote 136 may include a materials list, time to manufacture, cost to manufacture, equipment used, the dimensions of the finished part, weight of the part, part number, and the like. A manufacturing quote 136 may also include the geometrical tolerances calculated as a function of semantic datum 128 to go with each feature of the part. A manufacturing quote may include a recommendation of which work materials to use to manufacture the part. In some embodiments, a manufacturing quote 136 may include suggested methods of assembly for the part. A manufacturing quote may also include suggestions on the most efficient order of assembly for the part. Additionally, a manufacturing quote 136 may make suggestions on corrections to a unmachinable part in order to make it machinable of manufacturable. These suggestions may include increasing the tolerances for various features, changing the material of the part, and/or altering the part design.

With continued reference to FIG. 1, processor 104 may be configured to generate a manufacturing quote 136 as a function of the machinability datum 132. A manufacturing quote 136 may depict a visual representation of the part for manufacture 120. The machinability datum 132 may be overlayed on top of the visual depiction. Machinability datum 132 may be depicted as an overall score for the part. The machinability datum 132 may also be depicted as a score for each geometric feature of the part. Machinability scores below a predetermined range may depict the unmachinable qualities of the part for manufacture 120. Within the manufacturing quote 136, correction to the unmachinable qualities may be depicted as annotated. Unmachinable qualities may be described in redline drawings to confer corrections, which may be depicted with redlines and letter on the original drawing. Manufacturability may also be depicted in a manufacturing quote 136. Manufacturability may be calculated within manufacturing quote for various quantities of the part.

With continued reference to FIG. 1, processor 104 may be configured to generate a manufacturing quote as a function of semantic datum 128. The semantic datum 128 may be shown over each individual geometric feature of the part for manufacture 120 within manufacturing quote 136. Manufacturing quote 136 have semantic datum 128 displayed within a spreadsheet. The spreadsheet may be annotated depicting semantic datum 128 that makes the part for manufacture unmachinable. Corrections for unmachinable tolerances may also be included within the spreadsheet or the visual depiction.

More disclosure related to generating quotes may be found in U.S. Nonprovisional application Ser. No. 14/060,033 filed on Oct. 22, 2013, and entitled, "AUTOMATED FABRICATION PRICE QUOTING AND FABRICATION ORDERING FOR COMPUTER-MODELED STRUCTURES", which claims the benefit of priority of U.S. Provisional Patent Application Ser. No. 61/717,185, filed on Oct. 23, 2012, and titled "SYSTEM AND METHOD FOR GENERATING QUOTES AND ORDERING PARTS," which is incorporated by reference herein in its entirety.

With continued reference to FIG. 1, apparatus 100 may include inspection module 116 operating on processor 104. Inspection module 116 may include any hardware and/or software module. Inspection module 116 is configured to orient, by an automated operator, the mechanical part datum within a representative inspection system. The representative inspection system comprises a visual representation of a coordinate-measuring machine and fixturing system. Orientation may be displayed to an automated operator using graphical user interface 120. Automated operator, as used herein, is a person, hardware, and/or software which engages in any step and/or combination of steps of the manufacturing process of the mechanical part. A step of the manufacturing process may include, for example and without limitation, receiving a mechanical part datum from a user client device, orienting the mechanical part datum within a representative inspection system, and/or any step utilizing the coordinate-measuring machine. For example and without limitation, an automated operator may include a person interacting with apparatus 100, wherein a person may further include an inspection designer who builds the fixture model and specifies measurements, a floor operator running the CMM using the program and fixtures created by the designer, and the like.

Figure 2:
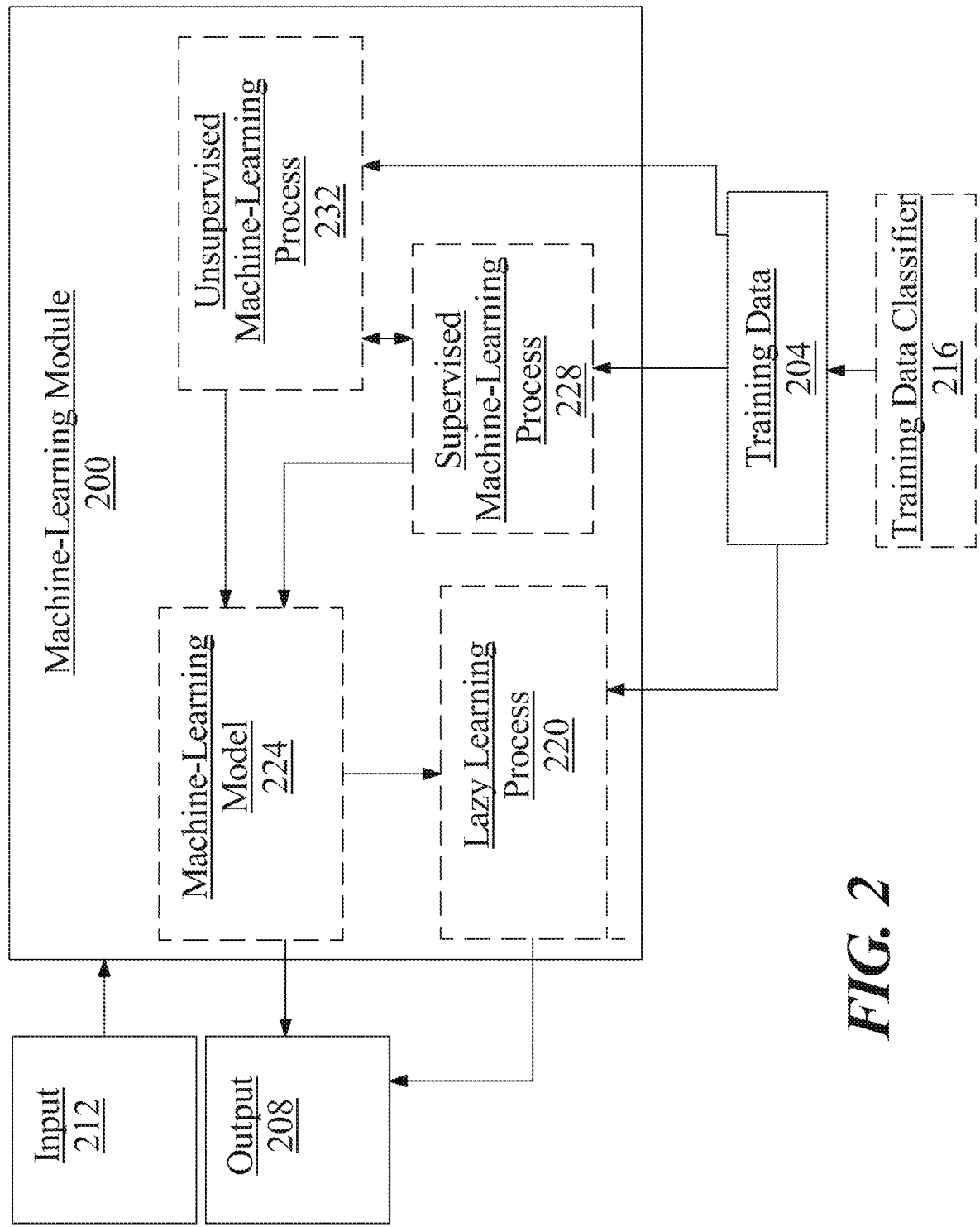
FIG. 2 illustrates a block diagram of an embodiment of a machine-learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs described in this disclosure as inputs, outputs described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
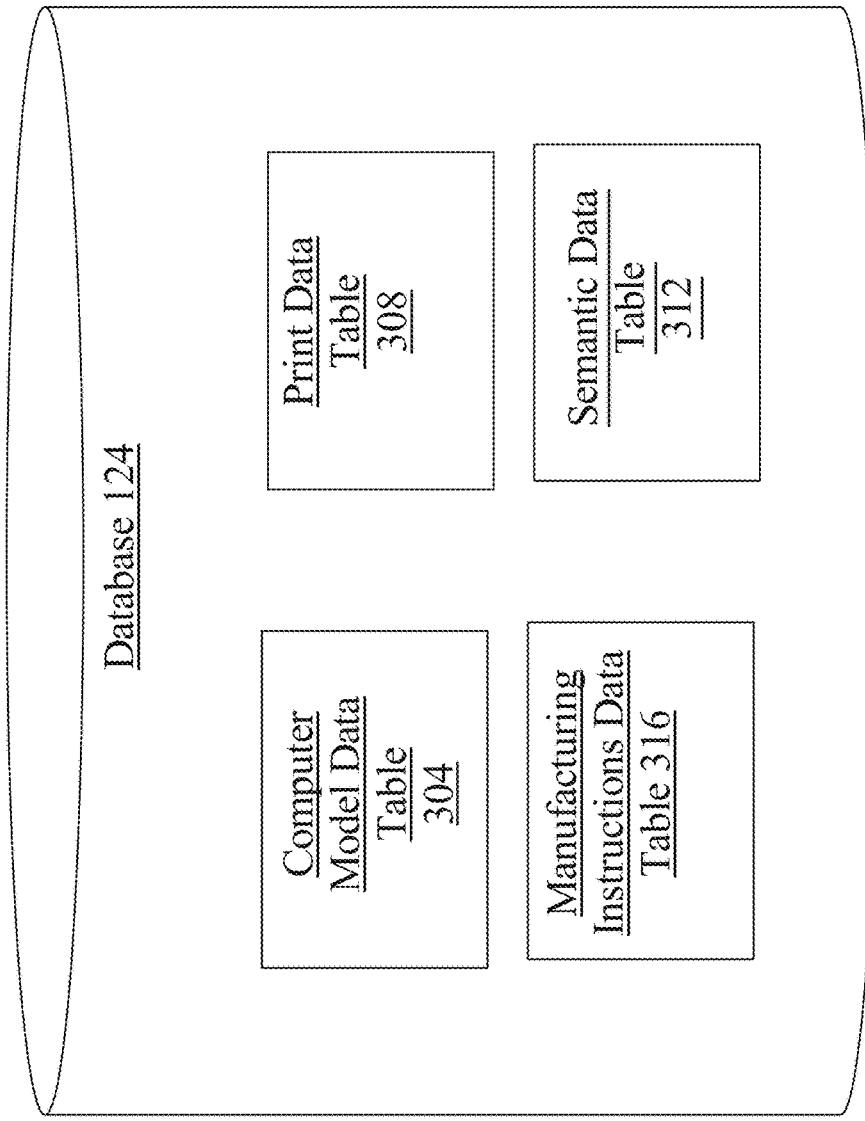
FIG. 3 is a block diagram illustrating an embodiment of an internal database.

Referring now to FIG. 3, an embodiment of database 124 is illustrated. Database 124 may be implemented as a hardware and/or software module. Database 124 may be implemented, without limitation, as a relational database, a key-value retrieval datastore such as a NOSQL database, or any other format or structure for use as a datastore that a person skilled in the art would recognize as suitable upon review of the entirety of this disclosure. database 124 may contain datasets that may be utilized by unsupervised machine-learning model 200 to find trends, cohorts, and shared datasets between data contained within database 124 and representative part model 108. In an embodiment, datasets contained within database 124 may be categorized and/or organized according to shared characteristics. For instance and without limitation, one or more tables contained within database 124 may include representative part model data table 300, wherein computer model data table 304 may include stored representative part model 108. As a further example and without limitation, one or more tables contained within database 124 may include print data table 308, wherein print data table 308 may include stored print 116.

Figure 4:
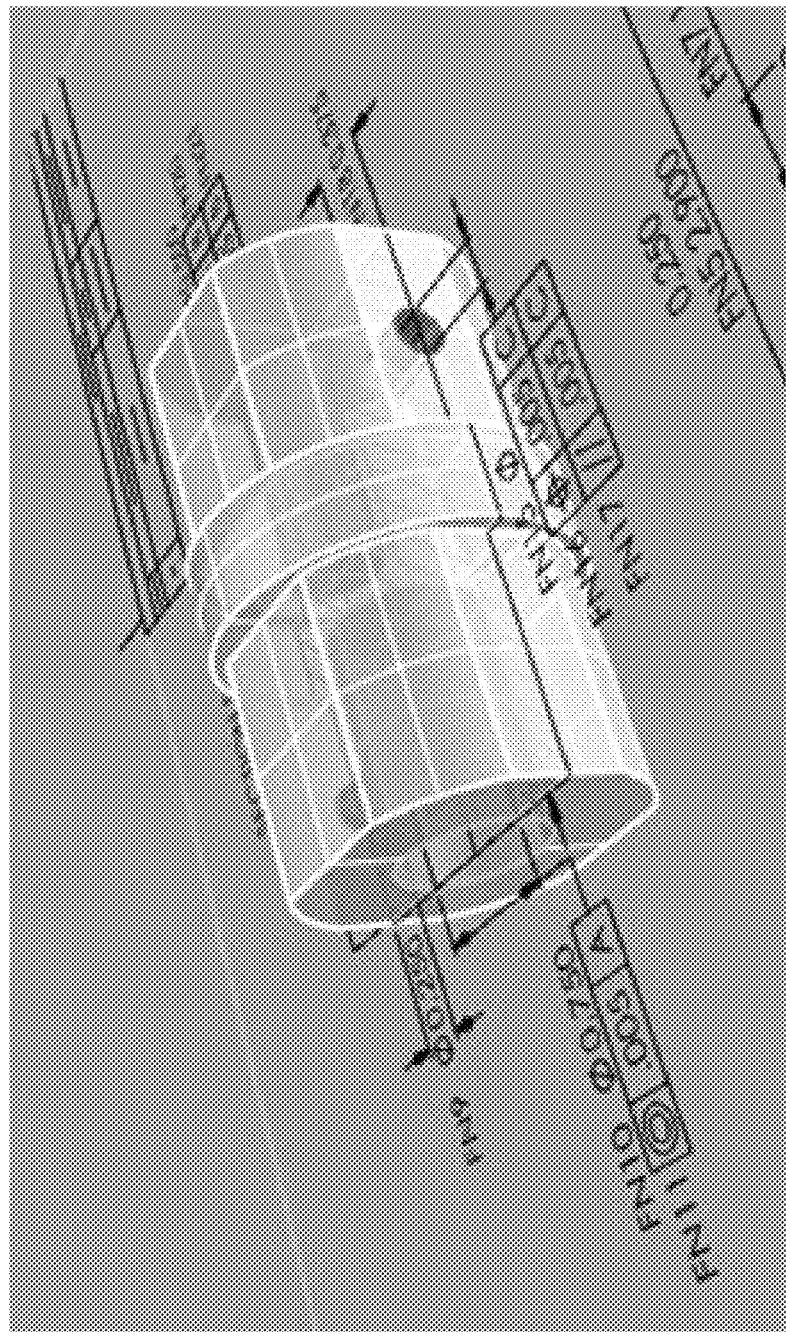
FIG. 4 is a screen shot of an exemplary embodiment of semantic datum mapped on a computer model.

Referring now to FIG. 4, an embodiment of semantic datum mapped on a computer model is illustrated. Computer model 600 includes a three-dimensional image of part for manufacture 112. Semantic datum 128 is mapped on computer model 500, as discussed in detail above pertaining to FIG. 1.

Figure 5:
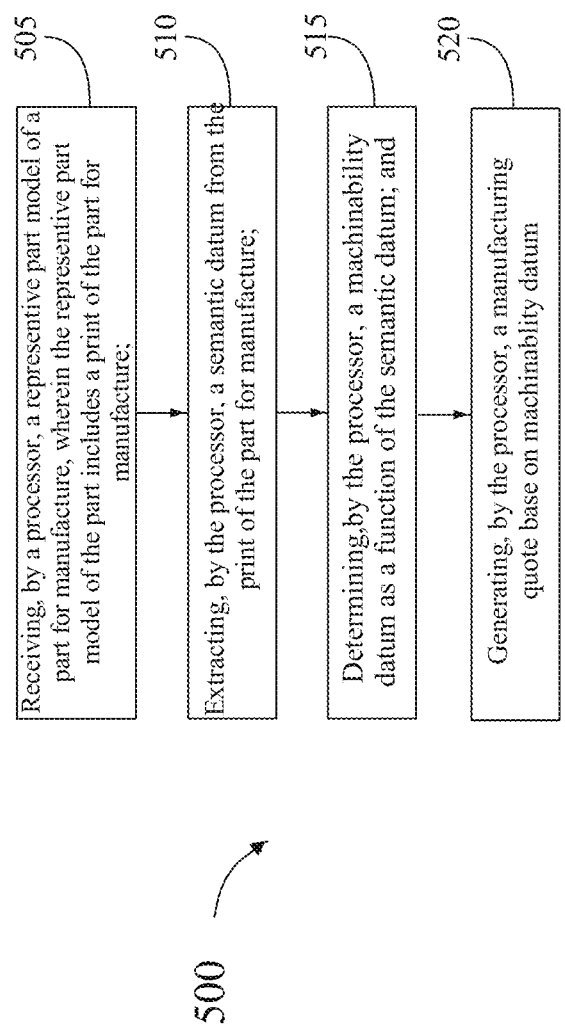
FIG. 5 is a process flow diagram illustrating an embodiment of a method for analyzing machinability of a part for manufacture.

Referring now to FIG. 5, an embodiment of method 500 for geometric dimensioning and tolerancing of a part for manufacture is illustrated. At step 505, processor receives a representative part model of part for manufacture, wherein the representative part model of the part includes a print of the part for manufacture; this may be implemented, without limitation, as described above in reference to FIGS. 1-6. Processor may receive representative part model from user device. representative part model may include a plurality of sides. Representative part model may comprise a three-dimensional image of the part for manufacture. Representative part model may be received by processor utilizing any of the network methodology as described herein. Representative part model may include any representative part model 108 as described herein. Each side of the plurality of sides, as described herein, may be the plane of each coordinate in axis passing through the origin of the representative part model. For example and without limitation, the axis may include a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin, as described in further detail above in reference to FIG. 1. In an embodiment, Representative part model 108 may further include semantic information. Semantic information may include any semantic information as described above in further detail in reference to FIG. 1.

Still referring to FIG. 5, at step 510, the processor extracts a semantic datum from the print of the part for manufacture, without limitation, as described above in reference to FIGS. 1-6. Semantic datum may include any datum described in the instant disclosure with respect to FIGS. 1-6. Semantic datum from print may include text. Extracting semantic datum may utilize a machine-learning process With continued reference to FIG. 5, at step 515, determining a machinability datum as a function of the semantic datum; this may be implemented, without limitation, as described above in reference to FIGS. 1-6. Determining a machinability datum may utilize a machine-learning process.

Still referring to FIG. 5, at step 520, generating a manufacturing quote based on the machinability datum; this may be implemented, without limitation, as described above in reference to FIGS. 1-6. A manufacturing quote may be any quote in the instant disclosure with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
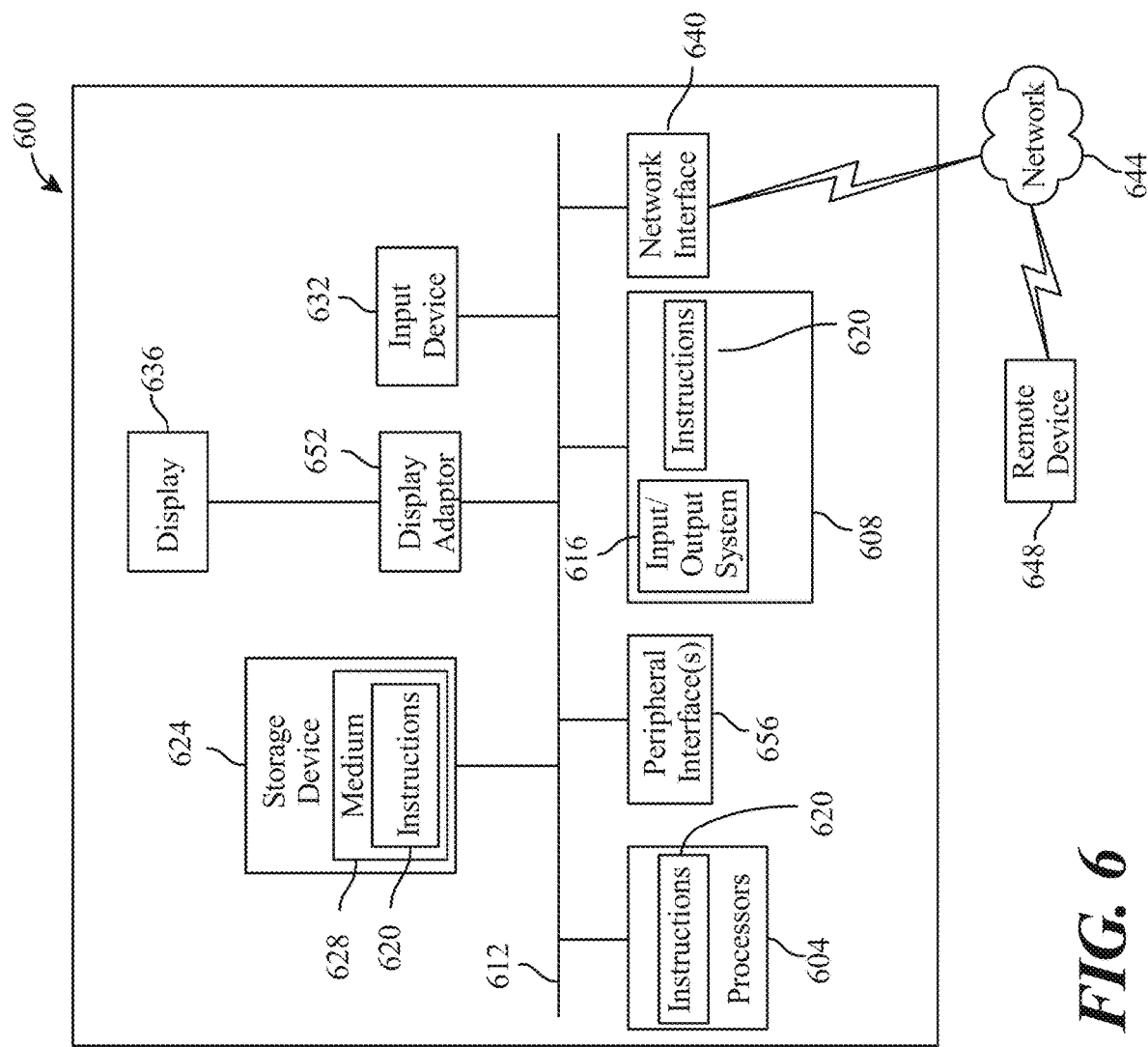
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for analyzing machinability of a part for manufacture, wherein the apparatus comprises:
   a processor; and
   a memory communicatively connected to the processor, the memory containing instructions configuring the processor to:
   receive a representative part model of a part for manufacture, wherein the representative part model includes a print of the part for manufacture;
   extract a semantic datum from the print of the part for manufacture;
   determine a machinability datum as a function of the semantic datum, wherein determining the machinability datum further comprises:
   training a machine learning model as a function of training data and a machine learning algorithm, wherein the training data correlates semantic data and machinability data; and
   generating, using the trained machine learning model, the machinability datum, wherein the semantic datum is provided to the trained machine-learning model as an input to output the machinability datum; and
   generate a manufacturing quote as a function of the machinability datum;
   display the machinability datum within the manufacturing quote or on a user device.

2. The apparatus of claim 1, wherein extracting the semantic datum further comprises extracting the semantic datum as a function of the print and a machine learning process.

3. The apparatus of claim 1, wherein the processor is configured to determine the manufacturability of the part for manufacture as a function of the machinability datum.

4. The apparatus of claim 3, wherein the processor is configured to:
   determine that the part cannot be machined as a function of the machinability datum;
   identify unmachinable qualities of the part; and
   identify corrections to the part to improve machinability.

5. The apparatus of claim 1, wherein the print of the part for manufacture comprises geometric dimensioning and tolerancing (GD&T) information.

6. The apparatus of claim 1, wherein the print comprises a two-dimensional image of the part for manufacture.

7. The apparatus of claim 1, wherein the semantic datum from the print comprises text.

8. The apparatus of claim 1, wherein the processor is configured to map the semantic datum on a three-dimensional image of the part for manufacture in a computer model.

9. The apparatus of claim 1, wherein generating the manufacturing quote comprises generating text based on the semantic datum.

10. A method for analyzing machinability of a part for manufacture, wherein the method comprises:
> receiving, by a processor, a representative part model of a part for manufacture, wherein the representative part model of the part includes a print of the part for manufacture;
> extracting, by the processor, a semantic datum from the print of the part for manufacture;
> determining, by the processor, a machinability datum as a function of the semantic datum, wherein determining the machinability datum further comprises:
>> training a machine learning model as a function of training data and a machine learning algorithm, wherein the training data correlates semantic data and machinability data; and
>> generating, using the trained machine learning model, the machinability datum, wherein the semantic datum is provided to the trained machine-learning model as an input to output the machinability datum; and
>
> generating, by the processor, a manufacturing quote based on the machinability datum;
> displaying the machinability datum within the manufacturing quote or on a user device.

11. The method of claim 10, wherein extracting the semantic datum further comprises extracting the semantic datum as a function of the print and a machine learning process.

12. The method of claim 10, wherein the processor is configured to determine the manufacturability of the part for manufacture as a function of the machinability datum.

13. The method of claim 12, wherein the processor is configured to:
> determine that the part cannot be machined as a function of the machinability datum;
> identify unmachinable qualities of the part; and
> identify corrections to the part to improve machinability.

14. The method of claim 10, wherein the of the part for manufacture comprises geometric dimensioning and tolerancing (GD&T) information.

15. The method of claim 10, wherein the print comprises a two-dimensional image of the part for manufacture.

16. The method of claim 10, wherein the semantic datum from the print comprises text.

17. The method of claim 10, wherein the method further comprises mapping the semantic datum on a three-dimensional image of the part for manufacture in a computer model.

18. The method of claim 10, wherein generating the manufacturing quote comprises generating text based on the semantic datum.

* * * * *